United States Patent [19]

Tanaka

[11] Patent Number: 4,499,636
[45] Date of Patent: Feb. 19, 1985

[54] REMOVABLE TWO-PIECE RETAINING MEANS

[75] Inventor: Toshie Tanaka, Tokyo, Japan

[73] Assignee: Nifco Inc., Yokohama, Japan

[21] Appl. No.: 492,273

[22] Filed: May 6, 1983

[51] Int. Cl.³ .................... A44B 17/00; F16B 13/04
[52] U.S. Cl. ........................................ 24/289; 24/297; 24/453; 411/15; 411/508
[58] Field of Search ............ 24/90 C, 289, 293, 297, 24/305, 689, 453; 411/15, 60, 508, 509, 510

[56] References Cited

U.S. PATENT DOCUMENTS

| | | | |
|---|---|---|---|
| 3,074,134 | 1/1963 | Buechler | 24/289 |
| 3,213,745 | 10/1965 | Dwyer | 411/15 |
| 3,350,976 | 11/1967 | Topf | 411/510 |
| 3,651,734 | 3/1972 | McSherry | 411/15 |
| 3,776,092 | 12/1973 | Seckerson | 411/509 |
| 3,875,843 | 4/1975 | Maeda et al. | 411/508 |
| 4,312,165 | 1/1982 | Mizusawa | 411/510 |
| 4,422,222 | 12/1983 | Notoya | 411/508 |

FOREIGN PATENT DOCUMENTS 0001364  1/1977  Japan ..................... 411/509

Primary Examiner—Victor N. Sakran
Attorney, Agent, or Firm—J. R. Halvorsen; T. W. Buckman

[57] ABSTRACT

A fastener comprising a male member formed of a flat base, a clipping shank provided on the underside of the base, and a pillar erected upright from the upper side of the base and provided at the leading end thereof with a head, and a female member formed of a tubular part, a pair of depressing blades raised through thin-walled hinges from the tubular part and projected parts provided at the lower ends of the depressing blades. This fastener provides the fastening of a compressible sheet such as an insulator sheet or carpet to an interior decorative panel in an automobile, for example, by having the tubular part set around the pillar of the male member with the depressing blades kept in an upright position, causing the head of the pillar to force the depressing blades down to a level position thereby bringing the projected parts into fast engagement with the underside of the head of the pillar and nipping the compressible sheet fast in position between the male member and the female member.

8 Claims, 7 Drawing Figures

REMOVABLE TWO-PIECE RETAINING MEANS

BACKGROUND OF THE INVENTION

This invention relates to a fastener which is used for fastening such a compressible sheet as an insulator sheet or a carpet to a supporting panel.

To fasten an insulator sheet or a carpet to the dashboard in an automobile, for example, Japanese Utility Model Application Disclosure No. Sho 56(1981)-64839 discloses a metal plate molded as bent roughly in the shape of the letter U which provides the desired fastening by having the central piece thereof spot welded to the dashboard (supporting panel), causing the two raised pieces at the opposite ends thereof to be inserted through the matching holes bored in advance in the insulator sheet or carpet and bent down onto the supporting panel, or which provides the desired fastening by having one of the raised pieces thereof folded back in the shape of a claw, having the claw tightly nip a folded edge of the supporting panel and causing the other raised piece thereof to be inserted through a matching hole bored in advance in the insulator sheet or carpet and bent down onto the panel. With either of the versions of the fastener taught by the invention of the utility model application, the operator is required to bend the raised pieces with his fingers and, therefore, is often exposed to the possibility of sustaining injuries to his fingers. Further, since the fastening is obtained simply by bending the raised pieces down onto the panel with the fingers, when the insulator sheet or carpet is exposed to any external force tending to separate it from the supporting panel, there ensues the possibility that the raised pieces now in a bent form will be bent back in the direction of resuming the original shape and inducing unwanted release of the insulator sheet or carpet. The version of the fastener which involves causing the central piece thereof to be fastened to the panel by spot welding inevitably calls for the work of welding, which consumes much time and labor and entails the risk of rusting of the welded portion of the panel. The version of the fastener which involves causing the claw to be fastened as hooked on the edge of the panel inevitably entails the disadvantage that a complicated operation is required to bend the metal plate to the desired shape.

SUMMARY OF THE INVENTION

An object of this invention is to provide a fastener which permits an insulator sheet or a carpet to be readily attached fast to and removed from a panel particularly in an automobile.

To accomplish the object described above according to the present invention, there is provided a fastener which comprises a male member formed of a flat base, a clipping shank extended downwardly from the base, and a pillar raised upwardly from the base and provided at the upper end thereof with a head, and a female member formed of a tubular part for permitting insertion therethrough of the pillar of the male member, a pair of depressing blades continued through respective hinges into the upper end of the tubular part and opposed to each other and projecting parts extended downwardly from the portions at which the depressing blades are joined to the hinges. When the tubular part of the female member is put on the pillar of the male member and depressed along the length of the pillar, the head at the leading end of the pillar forces the projecting parts of the depressing blades upwardly and consequently brings the depressing blades down to a level position to keep a given compressible sheet fast on a given supporting panel and, at the same time, forces its way through the gap between the opposed projecting parts and comes down and gets itself hooked on the projecting parts to keep the depressing blades fast in the level position. By this simple work, the fastener of the present invention is capable of fastening the carpet to the floor panel. The release of the fastener from the panel is effected by forcing down the depressing blades at the same time thereby opening the gap again between the projecting parts and permitting the pillar of the male member to be withdrawn through the gap.

The other objects and characteristic features of the present invention will become apparent to those skilled in the art as the disclosure is made in the following description of one preferred embodiment as illustrated in the accompanying drawings.

DESCRIPTION OF THE PREFERRED EMBODIMENTS

Figure 1:
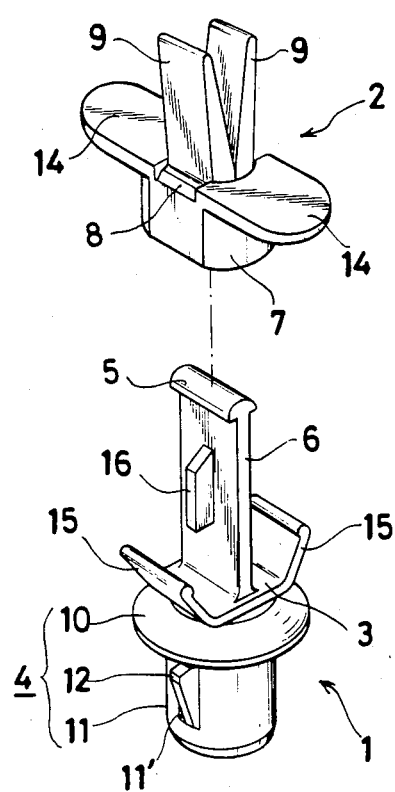
FIG. 1 is a perspective view illustrating a female member and a male member as held in a separated condition.

This invention concerns a two-member fastener molded of a plastic material, which is used for the purpose of fastening an insulator sheet and a carpet superposed on the insulator sheet both to the dashboard and to the floor panel in an automobile, for example.

The fastener of this invention comprises a male member 1 and a female member 2. The male member 1 is integrally formed of a flat base 3, a clipping shank 4 extended downwardly from the base 3 and adapted to be secured to a substrate A such as a supporting panel, and an upright pillar 6 provided at the upper end thereof with an head 5 and adapted to be loosely passed upwardly through a hole b in a compressible material B consisting of an insulator sheet and a carpet overlaid on the insulator sheet. The female member 2 comprises a tubular part 7 adapted to be set on the aforementioned pillar 6, depressed along the length of the pillar, and sent through the hole b in the compressible material and a pair of depressing blades 9 continued through respective thin-walled hinges 8 into the upper end of the tubular part 7 and opposed to each other. The male member and the female member are separately molded of a suitable plastic material possessing elasticity.

The clipping shank 4 in the present embodiment comprises a thin-walled conical flange 10 formed on the underside of the base 3, a cylindrical part 11 concentrically extended downwardly from the flange, and a pair of claws 12 having free ends on the upperside and projected out of the periphery of the cylindrical part 11 through notches 11' formed as diametrically opposed in the circular wall of the cylindrical part 11. When the cylindrical part 11 held above the substrate A is depressed into a fitting hole in the substrate, the claws 12 are pushed inwardly by the edge of the hole and allowed to descend through the fitting hole. When the descent is completed, the claws again are projected by their own elasticity out of the periphery of the cylindrical part 11 and brought up into fast engagement with the edge of the hole. In this condition, the claws and the conical flange 10 now more flatly compressed against the upper surface of the substrate A cooperate to nip the substrate therebetween. Consequently, the male member is fastened to the substrate. The clipping shank 4 is not limited to the illustrated construction. It may be in the shape of an anchor or canoe, for example.

The thin-walled hinges 8 of the female member 2 connect the outer lower portions of the depressing blades 9 to the inner surface at the upper end of the tubular part 7 and allow the depressing blades to be thrust upwardly from the inner surface of the tubular part 7. These depressing blades 9 are provided below the thin-walled hinges 8 each with a projected part 9'. In the illustrated embodiment, the projected parts 9' are provided at their lower ends with a hill-shaped cam 13.

Figure 2:
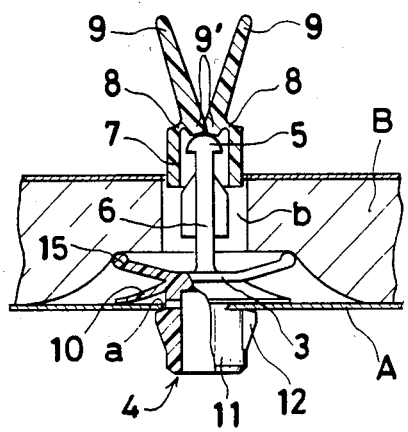
FIGS. 2–5 are explanatory diagrams of a procedure illustrating sequentially the steps involved from the time the female member is depressed till the time the compressible sheet is attached fast to the supporting panel.
Figure 3:
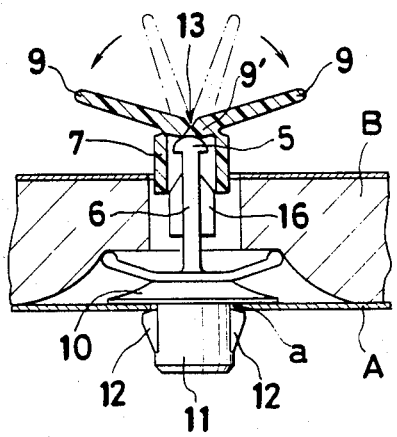
Figure 4:
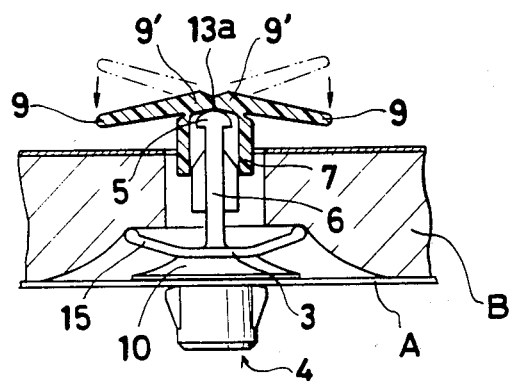
Figure 5:
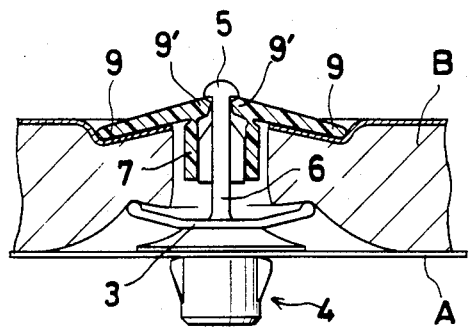

The fastening of the compressible sheet B to the substrate A is accomplished by fixing the male member 1 as described above to the substrate A, then applying the compressible sheet B to the substrate A, fitting the hole b of the compressible sheet to the pillar 6 of the male member, setting the tubular part 7 of the female member 2 on the pillar 6 and, at the same time, depressing the female member 2 into the hole b of the compressible sheet, and causing the head 5 at the upper end of the pillar to force up the projected parts 9' of the depressing blades. Consequently, the depressing blades begin to descend outwardly to the opposite directions as they rotate about the hinges 8 (FIG. 2). After they have descended to a certain extent, the peaks of the cam 13 of the projected parts come into contact with each other (FIG. 3). As the head 5 is further raised, the cam surfaces 13a are brought into face contact by the toggle action to bring the depressing blades to a level position (FIG. 4). The head 5 is then thrust up through the interface between the cam surfaces 13a which are held in fast face contact. During the passage of the head 5 through the interface, the depressing blades are further pushed down in their level position. After the head 5 has completed this passage, the depressing blades are slightly relieved of this pressure. At this point the projected parts are seized fast under the head and, consequently, the depressing blades are maintained in a position flattened yet slightly raised from the horizontal to keep the compressible sheet compressed and held down fast on the upper surface of the substrate (FIG. 5). Thus, the fastener of the present invention compresses the elastic compressible sheet and fastens it on the substrate. The fastness with which the compressible sheet is attached to the substrate, therefore, increases in proportion as the elasticity of the sheet is increased.

Figure 6:
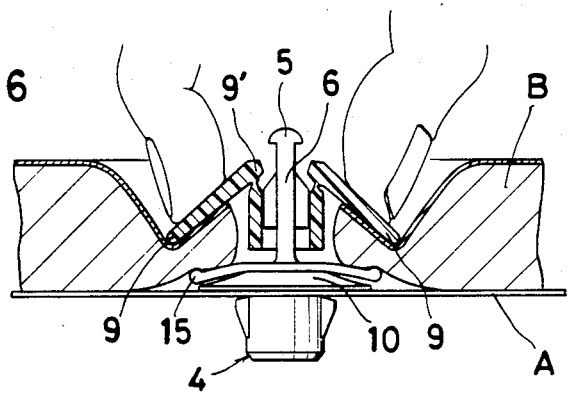
FIGS. 6 and 7 are explanatory diagrams illustrating the procedure to be followed in the removal of the compressible sheet from the supporting panel.
Figure 7:
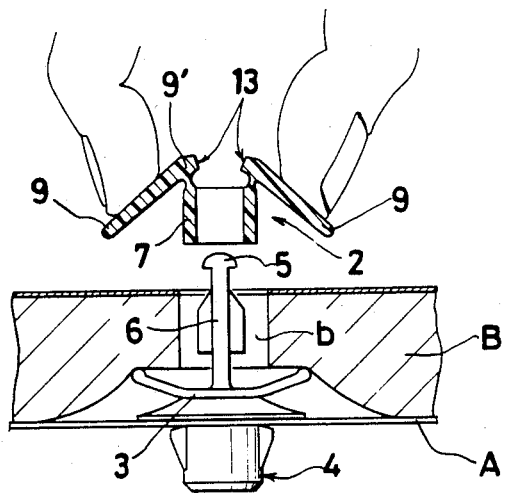

When the union thus obtained between the compressible sheet and the substrate is required to be dissolved, the dissociation of this union is accomplished by pressing the depressing blades into the compressible sheet by taking advantage of the compressibility of the sheet, pinching the depressing blades with the finger tips (FIG. 6) so as to separate the projected parts 9' to a distance greater than the size of the head 5, and extracting the tubular part upwardly from the pillar with the projected parts kept in the pinched state (FIG. 7). When the finger tips are then removed from the depressing blades, the depressing blades tend to resume their original upright position owing to the elasticity of the hinges 8, but are actually allowed to return only to the level position in which the cam surfaces 13a of the projected parts are held in surface contact. When the separated compressible sheet is desired to be again attached to the substrate, the head 5 of the pillar has only to be thrust up through the interface between the cam surfaces 13a to effect compressed attachment of the compressible sheet. Thus, the force which was required in causing the head to force the upright depressing blades down to the level position in the initial attachment of the sheet to the substrate is no longer required.

Further in the illustrated embodiment, pinches 14 adapted to facilitate the depression of the female member 2 into engagement with the male member 1 by the finger tips are integrally formed at the upper end of the tubular part as disposed perpendicularly to the depressing blades 9. These pinches 14 concurrently serve the purpose of holding the compressible sheet down. They are not an essential element for the fastener of this invention. In the illustration, the pillar 6 is depicted in the shape of a plate and the head 5 in a shape laterally extended from the opposite sides of the upper end of the plate-shaped pillar. Optionally, this pillar may be formed in the shape of a pin of a circular or rectangular cross section erected upright substantially at the center of the upper surface of the base and the head 5 may be radially extended laterally from the entire periphery of the pin. In this modified construction of the pillar and its head, there is enjoyed the advantage that the tubular part 7 of the female member can be set on and depressed along the pillar without reference to the direction of the tubular part 7 to the pillar.

As is plain from the foregoing description, the fastener of the present invention provides the fastening of a compressible sheet to a substrate by securing the male member with the clipping shank to the substrate, setting the tubular part of the female member to the pillar of the male member and depressing the tubular part along the depth of the pillar, and causing the head of the pillar to bring the depressing blades down to a slightly slanted position so as to fasten the compressible sheet in a compressed form onto the substrate. The distance from the upper surface of the base 3 to the lower side of the head of the pillar is determined in consideration of the thickness of the compressible sheet and the extent to which the sheet is compressible. When upwardly diverging support pieces 15 are disposed at the opposite ends of the base 3 as illustrated, they elastically support from below the portions of the compressible sheet which are held down by the depressing blades. The provision of these support pieces 15 offers the advantage that the fastener becomes capable of safely fastening the compressible sheet onto the substrate even when there is some dispersion in the thickness or the extent of compressibility of the sheet.

Further, on the portion of the pillar which falls below the head, protruding parts 16 in the shape of fins may be disposed outside the portions reserved for engagement with the projected parts of the depressing blades. When the pillar is in the shape of a pin, for example, the portion of the pillar containing the aforementioned protruding parts 16 may have a cruciate cross section, so that the cruciate cross section will exactly fit into the inner wall of the tubular part of the female member and prevent the pillar from freely rotating inside the tubular part.

The present invention gives a perfect solution to the drawbacks suffered by the conventional fasteners and enables such a compressible sheet as an insulator sheet or a carpet to be readily fastened to a substrate without exposing the worker's fingers to the danger of injuries or entailing any troublesome welding work. Besides, the union established between the compressible sheet and the substrate may be easily dissolved when necessary. Thus, the fastener can be used repeatedly.

What is claimed is:

1. A fastener, comprising
    a male member formed integrally of a flat base, a clipping shank extended downwardly from the lower side of said base, and a pillar raised upwardly from said base and provided at the upper end thereof with a head extended outwardly from the periphery of said pillar, and
    a female member formed integrally of a tubular part adapted to be lowered around said pillar of said male member, a pair of elongated depressing blades opposed diametrically to each other and each connected intermediate their length by thin-walled hinges which extend from the upper end of said tubular part, and each of said blades having a short portion thereof extended from said depressing blades below said thin-walled hinges,
    said short portion of said blades being formed in a length such that when said tubular part, while in a state having said depressing blades erected in an upright position, is set around said pillar of said male member and subsequently said depressing blades are rotated down to a substantially level position, said short portion of each blade will be brought into mutual surface contact under opposite sides of said pillar head.

2. A fastener according to claim 1, wherein said clipping shank comprises a thin-walled conical flange formed on the underside of said base and a cylindrical part concentrically extended downwardly from said flange and provided at a plurality of positions on the periphery thereof with elastically retractable claws, said clipping shank thus serving to set a compressible sheet in position between said flange and said claws.

3. A fastener according to claim 1, which further comprises upwardly diverging supporting pieces disposed at the opposite ends of said base of said male member.

4. A fastener according to claim 2, which further comprises upwardly diverging supporting pieces disposed at the opposite ends of said base of said male member.

5. A fastener according to claim 1, wherein said short portion of each blade of said female member are provided at the leading ends thereof with cams of the shape of a peak.

6. A fastener according to claim 4, wherein said short portion of each blade of said female member are provided at the leading ends thereof with cams of the shape of a peak.

7. A fastener according to claim 1, wherein said pillar of said male member is provided on the opposite sides thereof with protruding parts of the shape of a fin to serve as guide means for said female member.

8. A fastener according to claim 6, wherein said pillar of said male member is provided on the opposite sides thereof with protruding parts of the shape of a fin to serve as guide means for said female member.

* * * * *